US011981141B2

(12) United States Patent
Fujii et al.

(10) Patent No.: US 11,981,141 B2
(45) Date of Patent: May 14, 2024

(54) WIPING METHOD AND IMAGE FORMING APPARATUS

(71) Applicants: Ichiroh Fujii, Kanagawa (JP); Takumi Atake, Tokyo (JP); Yohta Sakon, Kanagawa (JP); Akira Izutani, Osaka (JP); Hiroko Ohkura, Kanagawa (JP)

(72) Inventors: Ichiroh Fujii, Kanagawa (JP); Takumi Atake, Tokyo (JP); Yohta Sakon, Kanagawa (JP); Akira Izutani, Osaka (JP); Hiroko Ohkura, Kanagawa (JP)

(73) Assignee: Ricoh Company, Ltd., Tokyo (JP)

( * ) Notice: Subject to any disclaimer, the term of this patent is extended or adjusted under 35 U.S.C. 154(b) by 18 days.

(21) Appl. No.: 17/753,267

(22) PCT Filed: Sep. 15, 2020

(86) PCT No.: PCT/IB2020/058540

§ 371 (c)(1),
(2) Date: Feb. 25, 2022

(87) PCT Pub. No.: WO2021/053496

PCT Pub. Date: Mar. 25, 2021

(65) Prior Publication Data

US 2023/0001696 A1 Jan. 5, 2023

(30) Foreign Application Priority Data

Sep. 18, 2019 (JP) ................................ 2019-169755
Jul. 28, 2020 (JP) ................................ 2020-127275

(51) Int. Cl.
*B41J 2/165* (2006.01)

(52) U.S. Cl.
CPC ....... *B41J 2/16544* (2013.01); *B41J 2/16552* (2013.01); *B41J 2002/16558* (2013.01)

(58) Field of Classification Search
CPC ................ B41J 2/16544; B41J 2/16552; B41J 2002/16558; B41J 2002/1655; B41J 2/16535
See application file for complete search history.

(56) References Cited

U.S. PATENT DOCUMENTS 11,130,343 B2 * 9/2021 Bannai ................ B41J 2/16544
11,179,940 B2 * 11/2021 Bannai ................ B41J 2/16535
(Continued)

FOREIGN PATENT DOCUMENTS

CN 1636739 7/2005
CN 106661787 A * 5/2017 ............ A47L 13/16
(Continued)

OTHER PUBLICATIONS

Chinese Office Action dated Nov. 18, 2022, in Chinese Patent Application No. 202080058700.X, 7 pages.
(Continued)

*Primary Examiner* — Sharon Polk
(74) *Attorney, Agent, or Firm* — Grüneberg and Myers PLLC

(57) ABSTRACT

A wiping method for wiping a nozzle surface of a liquid discharge head includes the step of relatively moving the liquid discharge head and a wiper impregnated with a cleaning fluid. The cleaning fluid contains a lactone compound in an amount of 5% by mass or more. The wiper includes a first layer configured to contact the nozzle surface and one or more layers other than the first layer. The first layer has a thickness of t1, the one or more layers other than the first layer have a total thickness of t2, and t1 is smaller than t2. A void ratio of the first layer is smaller than a void ratio of at least one of the one or more layers other than the first layer.

16 Claims, 4 Drawing Sheets

(56) References Cited

U.S. PATENT DOCUMENTS

| | | | |
|---|---|---|---|
| 2005/0146554 A1 | 7/2005 | Asanuma et al. | |
| 2013/0141501 A1 | 6/2013 | Iida et al. | |
| 2014/0292919 A1 | 10/2014 | Kobayashi et al. | |
| 2016/0114585 A1 | 4/2016 | Kobayashi | |
| 2018/0170061 A1 | 6/2018 | Nakamura et al. | |
| 2018/0264821 A1 | 9/2018 | Sato et al. | |
| 2018/0319158 A1 | 11/2018 | Ichiroh et al. | |
| 2019/0366721 A1 | 12/2019 | Ohkura et al. | |
| 2020/0164650 A1 | 5/2020 | Bannai et al. | |
| 2020/0164652 A1 | 5/2020 | Bannai et al. | |
| 2020/0171832 A1 | 6/2020 | Akima et al. | |
| 2020/0207096 A1 | 7/2020 | Horie et al. | |
| 2020/0207099 A1 | 7/2020 | Sakon et al. | |
| 2020/0254472 A1 | 8/2020 | Tanaka et al. | |
| 2021/0016327 A1* | 1/2021 | Atake | B08B 3/08 |

FOREIGN PATENT DOCUMENTS

| | | |
|---|---|---|
| CN | 108215506 | 6/2018 |
| EP | 3 205 502 | 8/2017 |
| EP | 3539782 | 9/2019 |
| JP | 2008-137266 | 6/2008 |
| JP | 2011-194744 | 10/2011 |
| JP | 2014-188900 | 10/2014 |
| JP | 2016-165871 | 9/2016 |
| JP | 2017-144566 | 8/2017 |
| JP | 2017-186451 | 10/2017 |
| JP | 2019-147261 | 9/2019 |
| WO | 2019/176691 | 9/2019 |

OTHER PUBLICATIONS

International Search Report dated Nov. 20, 2020 in PCT/IB2020/058540 filed on Sep. 15, 2020.

Japanese Office Action dated Jan. 22, 2024, in Japanese Application No. 2020-127275, 2 pages.

European Communication under Rule 71(3) EPC, Intention to Grant, dated Mar. 5, 2024, in European Application No. 20775415.1, 9 pages.

Japanese Office Action dated Mar. 4, 2024, in Japanese Patent Application No. 2020-127275, 2 pages.

* cited by examiner

WIPING METHOD AND IMAGE FORMING APPARATUS

CROSS-REFERENCE TO RELATED APPLICATIONS

This application is the National Stage entry under § 371 of International Application No. PCT/IB2020/058540, filed on Sep. 15, 2020, and which claims the benefit of priority to Japanese Application No. 2019-169755, filed on Sep. 18, 2019, and Japanese Application No. 2020-127275, filed Jul. 28, 2020. The content of each of these applications is hereby incorporated by reference in its entirety.

BACKGROUND OF THE INVENTION

Technical Field

The present disclosure relates to a wiping method for wiping a nozzle surface of a liquid discharge head using a wiper and an image forming apparatus equipped with the wiper.

Description of Related Art

A liquid discharger, represented by an inkjet printer, needs regular cleaning of its nozzle surface because defective discharge may occur when foreign matters are present on the nozzle surface. One known method for cleaning the nozzle surface involves using a combination of sheet-like wipers such as a nonwoven fabric and a woven fabric.

Patent Document 1 describes a wiper that prevents deterioration of a water-repellent film on a nozzle surface. This wiper includes a first layer that contacts the nozzle surface and a second layer provided on the opposite side of the nozzle surface relative to the first layer. The first layer absorbs and introduces the dispersion medium of liquid droplets present on the nozzle surface to the second layer by the capillary action, and at the same time, captures the dispersoid in the voids of the first layer.

Therefore, this wiper wipes the nozzle surface without the dispersoid being sandwiched between the nozzle surface and the wiper, so that deterioration of the water-repellent film on the nozzle surface is prevented.

Patent Document 2 proposes a maintenance fluid for an inkjet printer, which contains a glycol ether.

CITATION LIST

Patent Literature

[PTL 1]
Japanese Unexamined Patent Application Publication No. 2014-188900
[PTL 2]
Japanese Patent No. 5566741

SUMMARY OF INVENTION

Technical Problem

The maintenance fluid of Patent Document 2 exhibits a high cleaning performance when being fresh. However, after the maintenance fluid has been left for a while, the wiping performance lowers because the maintenance fluid itself is easy to evaporate. To maintain the wiping performance, it is necessary to supply the fresh maintenance fluid constantly, which results in a large consumption of the maintenance fluid.

An object of the present invention to provide a wiping method for wiping a nozzle surface of a liquid discharge head using a wiper that is capable of holding a cleaning fluid even after being left for a while and of keeping the initial wiping performance during supply of the cleaning fluid.

Solution to Problem

The above-described problem can be solved by the following wiping method according to an embodiment of the present invention. The wiping method is for wiping a nozzle surface of a liquid discharge head. The wiping method includes the step of relatively moving the liquid discharge head and a wiper impregnated with a cleaning fluid. The cleaning fluid contains a lactone compound in an amount of 5% by mass or more. The wiper includes a first layer configured to contact the nozzle surface and one or more layers other than the first layer. The first layer has a thickness of t1, the one or more layers other than the first layer have a total thickness of t2, and t1 is smaller than t2. The void ratio of the first layer is smaller than the void ratio of at least one of the one or more layers other than the first layer.

Advantageous Effects of Invention

In the wiping method according to an embodiment of the present invention, the wiper is capable of holding a cleaning fluid even after being left for a while and of keeping the initial wiping performance during supply of the cleaning fluid. This is because the first layer well scrapes off the fixedly-adhered ink while the second layer secures ink absorptivity of the wiper and the cleaning fluid is less easy to evaporate.

BRIEF DESCRIPTION OF DRAWINGS

The accompanying drawings are intended to depict example embodiments of the present invention and should not be interpreted to limit the scope thereof. The accompanying drawings are not to be considered as drawn to scale unless explicitly noted. Also, identical or similar reference numerals designate identical or similar components throughout the several views.

DESCRIPTION OF EMBODIMENTS

Figure 1:
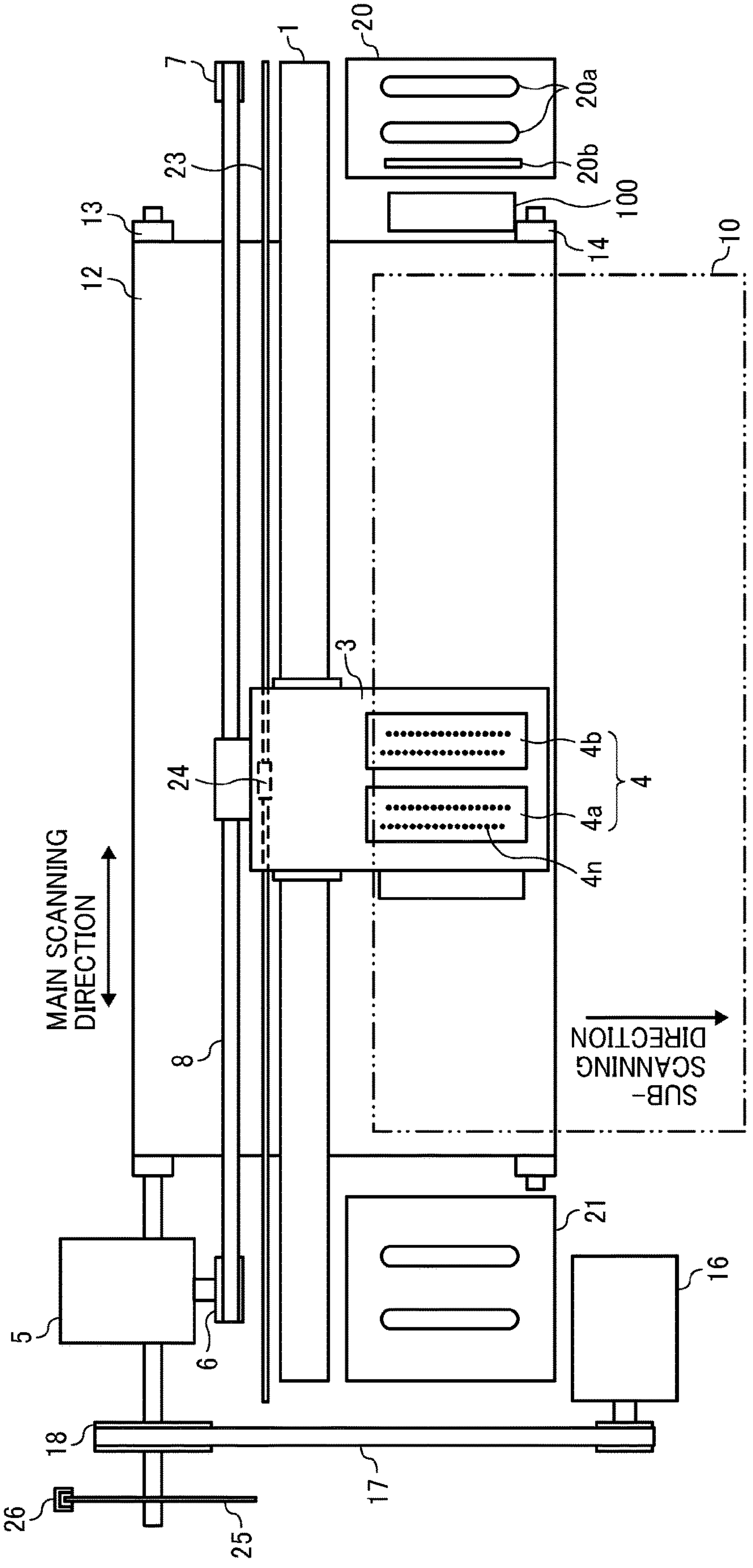
FIG. 1 is a schematic diagram illustrating an image forming apparatus according to an embodiment of the present invention.

The terminology used herein is for the purpose of describing particular embodiments only and is not intended to be limiting of the present invention. As used herein, the singular forms "a", "an" and "the" are intended to include the plural forms as well, unless the context clearly indicates otherwise.

In describing embodiments illustrated in the drawings, specific terminology is employed for the sake of clarity. However, the disclosure of this specification is not intended to be limited to the specific terminology so selected and it is to be understood that each specific element includes all technical equivalents that have a similar function, operate in a similar manner, and achieve a similar result.

In accordance with some embodiments of the present invention, a wiping method for wiping a liquid discharge head using a wiper, an image forming apparatus including a wiper, and a cleaning fluid are described in detail below.

Wiper

The wiper according to an embodiment of the present invention is configured to wipe a nozzle surface of a liquid discharge head and has the following features.

The wiper includes at least two layers.

The thickness t1 of the first layer that contacts the nozzle surface and the total thickness t2 of layers other than the first layer satisfy the formula t1<t2.

The first layer has a void ratio smaller than that of at least one of the layers other than the first layer.

Wiping Method Using Wiper and Image Forming Apparatus Equipped with Wiper

First, an image forming apparatus equipped with the wiper according to an embodiment of the present invention is described below.

FIG. 1 is a schematic diagram illustrating an image forming apparatus equipped with a serial-type droplet discharger. Details of this image forming apparatus are described with reference to FIGS. 1 and 2.

A carriage 3 is movably held by a main guide 1 laterally bridged between left and right side plates and a sub-guide. A main scanning motor 5 reciprocates the carriage 3 in the main scanning direction (carriage moving direction) via a timing belt 8 bridged between a drive pulley 6 and a driven pulley 7.

On the carriage 3, recording heads 4*a* and 4*b* (hereinafter each "recording head 4" when not distinguished), each comprising a liquid discharge head, are mounted. The recording head 4 discharges ink droplets of, for example, yellow (Y), cyan (C), magenta (M), or black (K).

The recording head 4 has nozzle arrays each comprising a plurality of nozzles 4*n*, arranged in the sub-scanning direction that is orthogonal to the main scanning direction. The recording head 4 is mounted with its droplet discharging direction downward.

Figure 2:
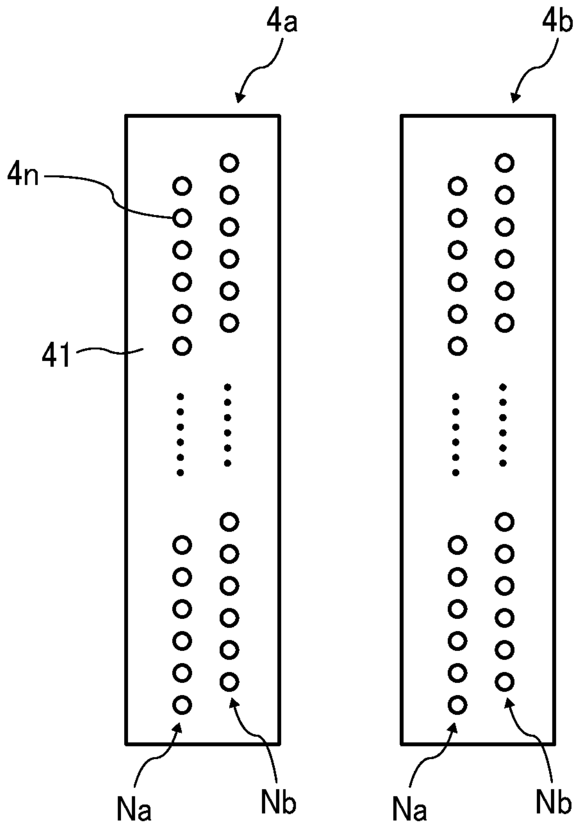
FIG. 2 is a schematic diagram illustrating a nozzle plate to be wiped with a wiper.

As illustrated in FIG. 2, the recording head 4 has a nozzle surface having two nozzle arrays Na and Nb in each of which a plurality of nozzles 4*n* are arranged.

Examples of the liquid discharge head constituting the recording head 4 include, but are not limited to, a piezoelectric actuator such as a piezoelectric element, and a thermal actuator that utilizes phase change of a liquid caused by film boiling using an electrothermal conversion element such as a heat element.

The image forming apparatus is further equipped with a conveyance belt 12 that electrostatically attracts a sheet 10 to convey the sheet 10 to a position facing the recording head 4. The conveyance belt 12 is an endless belt stretched between a conveyance roller 13 and a tension roller 14.

The conveyance belt 12 circumferentially moves in the sub-scanning direction as the conveyance roller 13 is rotationally driven by a sub-scanning motor 16 via a timing belt 17 and a timing pulley 18. The conveyance belt 12 is charged by a charging roller while circumferentially moving.

On one side of the carriage 3 in the main scanning direction, a maintenance mechanism 20 for maintaining the recording heads 4 is disposed lateral to the conveyance belt 12. On the other side, a dummy discharge receptacle 21 for receiving dummy discharge from the recording heads 4 is disposed lateral to the conveyance belt 12.

A discharge detecting unit 100 is disposed in a region that is outside a recording region between the conveyance belt 12 and the maintenance mechanism 20 and is capable of facing the recording head 4.

The maintenance mechanism 20 includes a cap 20*a* for capping the nozzle surface (surface on which the nozzles are formed) of the recording head 4, a nozzle surface wiping mechanism 20*b* for wiping the nozzle surface, and a dummy discharge receptacle to which liquid droplets not contributing to image formation are discharged.

An encoder scale 23 having a specific pattern thereon is stretched between both side plates along the main scanning direction of the carriage 3. The carriage 3 is provided with an encoder sensor 24 comprising a transmissive photosensor that reads the pattern on the encoder scale 23. The encoder scale 23 and the encoder sensor 24 configure a linear encoder (main scanning encoder) that detects movement of the carriage 3.

A code wheel 25 is mounted on the shaft of the conveyance roller 13, and an encoder sensor 26 comprising a transmissive photosensor that detects a pattern formed on the code wheel 25 is provided thereto. The code wheel 25 and the encoder sensor 26 configure a rotary encoder (sub-scanning encoder) that detects the amount of movement and the position of the conveyance belt 12.

In this image forming apparatus, the sheet 10 is fed from a sheet feeding tray and attracted onto the charged conveyance belt 12. The sheet 10 is then conveyed in the sub-scanning direction by circumferential movement of the conveyance belt 12.

By driving the recording heads 4 in response to an image signal while moving the carriage 3 in the main-scanning direction, ink droplets are discharged onto the sheet 10 not in motion, thus recording one line portion. The sheet 10 is thereafter conveyed for a specified distance and a next line portion is recorded thereon.

In response to a recording end signal or a signal indicating that the rear end of the sheet 10 has reached a recording area, the recording operation is ended and the sheet 10 is ejected onto an output tray.

To clean the recording heads 4, the carriage 3 is moved to the maintenance mechanism 20 during a waiting time for printing (recording), and the cleaning is performed by the maintenance mechanism 20. Alternatively, the cleaning may be performed by moving the maintenance mechanism 20 without moving the recording heads 4.

As illustrated in FIG. 2, the recording head 4 illustrated in FIG. 1 has a nozzle surface having two nozzle arrays Na and Nb in each of which a plurality of nozzles 4*n* are arranged. The nozzle array Na of the recording head 4*a* discharges droplets of black (K), and the other nozzle array Nb discharges droplets of cyan (C). The nozzle array Na of the recording head 4*b* discharges droplets of magenta (M), and the other nozzle array Nb discharges droplets of yellow (Y).

Figure 3:
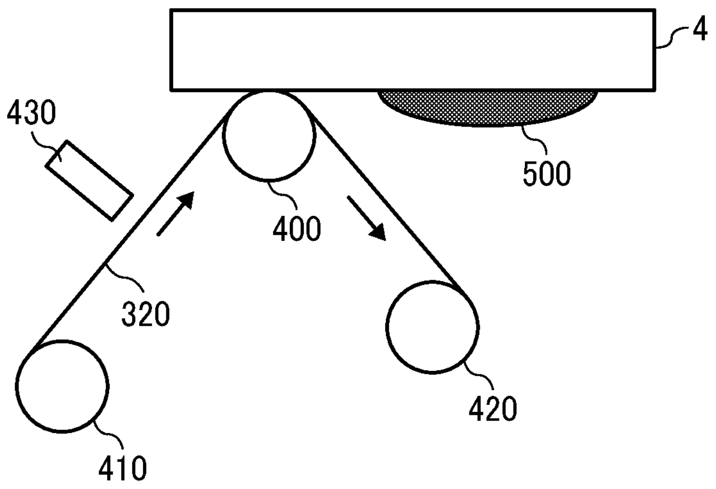
FIG. 3 is a schematic diagram illustrating a configuration of a wiping device of the image forming apparatus.

The nozzle surface wiping mechanism 20*b* is a wiping device which includes, as illustrated in FIG. 3, a sheet-like wiper 320 (serving as the wiper), a roller 410 configured to feed out the sheet-like wiper 320, a cleaning fluid dropping device 430 (serving as a cleaning fluid applicator that performs a cleaning fluid applying process) configured to apply a cleaning fluid to the sheet-like wiper 320 fed, a pressing roller 400 (serving as a presser) configured to press the fed sheet-like wiper 320 against the nozzle surface, and a winding roller 420 configured to collect the sheet-like wiper 320 having been used for wiping. The nozzle surface wiping mechanism 20*b* may further include a rubber blade or the like for wiping the nozzle surface in addition to the sheet-like wiper 320. The pressing roller 400 can adjust the pressing force by adjusting the distance between the sheet-like wiper 320 and the nozzle surface with a spring. The presser is not limited to be in the form of a roller and may be a fixed resin or a rubber member. In a case in which a rubber blade is provided, a mechanism for abutting the rubber blade on the sheet-like wiper 320 may be provided to impart a function of cleaning the rubber blade to the sheet-like wiper 320.

After a certain amount of the cleaning fluid is applied to the sheet-like wiper 320, the wiping device and the head are relatively moved with the sheet-like wiper 320 pressed against the nozzle surface, so that foreign matter 500 adhered to the nozzle surface is wiped off. Examples of the foreign matter 500 adhered to the nozzle surface include, but are not limited to, mist ink generated when ink is discharged from the nozzle, ink adhering to the nozzle surface when ink is sucked from the nozzle during cleaning, fixedly-adhered ink that is mist ink or ink adhering to the cap having been dried on the nozzle surface, and paper dust generated from print medium. The cleaning fluid may be contained in the sheet-like wiper 320 in advance. Alternatively, depending on the sequence, wiping may be performed without application of the cleaning fluid to the sheet-like wiper 320. In a case in which it is assumed that the ink has been dried and fixedly-adhered to the nozzle surface due to a long standby state, it is preferable that the fixedly-adhered ink is removed by wiping the nozzle surface multiple times with the sheet-like wiper 320 containing the cleaning fluid.

Figure 4:
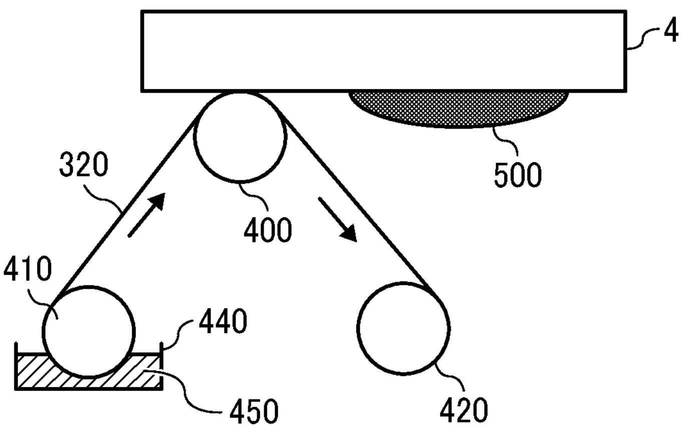
FIG. 4 is a schematic diagram illustrating another configuration of a wiping device of the image forming apparatus.

FIG. 4 is a schematic diagram illustrating another wiping device. The wiping device illustrated in FIG. 4 is provided with, in place of the cleaning fluid dropping device 430 illustrated in FIG. 3, a cleaning fluid accommodating container 440 accommodating a cleaning fluid 450. The wiper 320 is immersed in the cleaning fluid 450 to be impregnated with the cleaning fluid 450.

Figure 5:
FIG. 5 is a schematic cross-sectional diagram illustrating a sheet-like wiper.

FIG. 5 is a schematic cross-sectional diagram illustrating the sheet-like wiper 320.

The sheet-like wiper 320 illustrated in FIG. 5 comprises a nonwoven fabric having a two-layer structure including, from the side which comes into contact with the nozzle surface, a first layer 610 and a second layer 620. Alternatively, the wiper may be in a three-layer structure in which the wiper is backed with a film for preventing the bleed-through of the absorbed ink and improving the strength of the wiper, or a multi-layer structure in which a plurality of absorption layers having different absorptivity are provided after the second layer.

Examples of the material constituting the wiper include woven fabrics, knitted fabrics, and porous bodies, in addition to nonwoven fabrics. In particular, the first layer is preferably made of a nonwoven fabric whose thickness and porosity are relatively easy to control. Examples of the materials constituting fibers such as nonwoven fabrics, woven fabrics, and knitted fabrics include, but are not limited to, cotton, hemp, silk, pulp, nylon, vinylon, polyester, polypropylene, polyethylene, rayon, cupro, acrylic, and polylactic acid. The nonwoven fabric may be comprised of either one type of fiber or multiple types of fibers mixed. Examples of the porous bodies include, but are not limited to, polyurethane, polyolefin, and PVA. In producing nonwoven fabrics, web forming may be performed by wet, dry, spunbond, meltblown, or flash spinning methods, and web bonding may be performed by spunlace, thermal bond, chemical bond, or needle punch methods.

When the thickness of the first layer is smaller than the total thickness of the layers other than the first layer and the void ratio of the first layer is smaller than that of at least one of the layers other than the first layer, the ability for scraping off fixedly-adhered ink is improved, and wiping property for removing fixedly-adhering ink is improved. Here, the void ratio is calculated by the following formula (1).

$$\text{VOID RATIO} = 1 - \frac{\text{APPARENT DENSITY}}{\text{TRUE DENSITY}} \qquad \text{FORMULA (1)}$$

In a case in which the wiper comprises a sheet-like nonwoven fabric, the "true density" represents the true density of the fiber forming the sheet, and the "apparent density" is calculated by dividing the basis weight of the sheet-like material by the thickness thereof.

The ability of the wiper for scraping off fixedly-adhered ink becomes higher as the thickness becomes smaller and the void ratio becomes smaller. However, when the thickness is small and the void ratio is small, it becomes difficult for the wiper to hold liquid components such as ink and cleaning fluid, and as a result, the cleaning property becomes insufficient with a single layer. For this reason, the effect of the present invention is exerted when a layer capable of holding liquid components is provided other than the first layer and the layers of the wiper satisfy the above-described relations.

The void ratio of the first layer is preferably from 0.60 to 0.85, and more preferably from 0.75 to 0.80. When the void ratio of the first layer is from 0.60 to 0.85, wiping property for removing fixedly-adhered ink is improved, and the wiper is improved in liquid permeability without becoming a film-like shape.

The void ratio of at least one of the layers other than the first layer is preferably from 0.80 to 0.99. When the void ratio of at least one of the layers other than the first layer is within the above range, liquid absorptivity is improved. As the first layer is combined with such a layer other than the first layer, both the ability for scraping off fixedly-adhered ink and the liquid absorptivity are achieved at the same time, and thus wiping property is improved.

The thickness of the wiper is preferably from 0.1 to 3 mm, more preferably from 0.2 to 0.7 mm. When the thickness of the wiper is 0.1 mm or more, the saturated water absorption amount for liquid per unit area of the wiper is sufficient to sufficiently absorb the ink to be wiped off. When the thickness of the wiper is 3 mm or less, the liquid component of the ink is suitably transferred from the first layer to the layers other than the first layer without impairing the liquid absorptivity of the layers other than the first layer, thus making it possible to downsize the apparatus.

Preferably, at least the first layer of the wiper is comprised of a nonwoven fabric. When the first layer of the wiper is made of a nonwoven fabric, the thickness and void ratio of the wiper can be easily set to within desired ranges.

The wiping surface of the wiper preferably has a surface roughness Rz of 170 μm or more as measured with a laser microscope or the like. When the surface roughness Rz of the wiping surface is 170 μm or more, the meniscus in the nozzle is less likely to be broken, and the wiper can wipe the nozzle surface without causing defective discharge.

Cleaning Fluid

The cleaning fluid according to an embodiment of the present invention contains a lactone compound in an amount of 5% by mass or more, and further contains a water-soluble organic solvent and water as major components.

The lactone compound is a water-soluble organic solvent having a cyclic ester group.

Examples thereof include, but are not limited to, α-acetolactone, β-propiolactone, γ-butyrolactone, δ-valerolactone, and ε-caprolactone. The lactone compound has a higher boiling point than the water-soluble organic solvents to be described later and is not azeotropic with water. Therefore, the cleaning fluid containing the lactone compound is suppressed from evaporating from the wiper. Among the lactone compounds, γ-butyrolactone and ε-caprolactone are preferred.

The proportion of the lactone compound in the cleaning fluid is 5% by mass or more.

The proportion of the lactone compound in the cleaning fluid is preferably 5% by mass or more and 30% by mass or less, more preferably 5% by mass or more and 20% by mass or less, and most preferably 5% by mass or more and 15% by mass or less. When the proportion is 5% by mass or more, the cleaning fluid is suppressed from evaporating from the wiper.

When the proportion is 30% by mass or less, the wiping effect is good.

Water-Soluble Organic Solvent

Examples of the water-soluble organic solvent include, but are not limited to, polyols, ethers such as polyol alkyl ethers and polyol aryl ethers, nitrogen-containing heterocyclic compounds, amides, amines, and sulfur-containing compounds.

Here, the water-soluble organic solvent refers to an organic solvent which is soluble in 100 g of water at 25 degrees C. in an amount of 5 g or more.

Examples of the polyols include, but are not limited to, ethylene glycol, diethylene glycol, 1,2-propanediol, 1,3-propanediol, 1,2-butanediol, 1,3-butanediol, 1,4-butanediol, 2,3-butanediol, 3-methyl-1,3-butanediol, triethylene glycol, polyethylene glycol, polypropylene glycol, 1,2-pentanediol, 1,3-pentanediol, 1,4-pentanediol, 2,4-pentanediol, 1,5-pentanediol, 1,2-hexanediol, 1,6-hexanediol, 1,3-hexanediol, 2,5-hexanediol, 1,5-hexanediol, glycerin, 1,2,6-hexanetriol, 2-ethyl-1,3-hexanediol, ethyl-1,2,4-butanetriol, 1,2,3-butanetriol, 2,2,4-trimethyl-1,3-pentanediol, and 3-methyl-1,3,5-pentanetriol. Each of these can be used alone or in combination with others.

Examples of the polyol alkyl ethers include, but are not limited to, ethylene glycol monobutyl ether, propylene glycol monomethyl ether, propylene glycol monobutyl ether, diethylene glycol monoethyl ether, diethylene glycol monobutyl ether, diethylene glycol methyl ethyl ether, diethylene glycol dimethyl ether, diethylene glycol diethyl ether, dipropylene glycol monomethyl ether, dipropylene glycol monoethyl ether, propylene glycol-n-propyl ether, triethylene glycol monomethyl ether, triethylene glycol monoethyl ether, triethylene glycol monobutyl ether, and tripropylene glycol monomethyl ether. Each of these can be used alone or in combination with others.

Examples of the polyol aryl ethers include, but are not limited to, ethylene glycol monophenyl ether and ethylene glycol monobenzyl ether.

Examples of the nitrogen-containing heterocyclic compounds include, but are not limited to, 2-pyrrolidone, N-methyl-2-pyrrolidone, N-hydroxyethyl-2-pyrrolidone, 1,3-dimethyl-2-imidazolidinone, and ε-caprolactam. Each of these can be used alone or in combination with others.

Examples of the amides include, but are not limited to, formamide, N-methylformamide, N,N-dimethylformamide, 3-methoxy-N,N-dimethylpropionamide, and 3-butoxy-N,N-dimethylpropionamide. Each of these can be used alone or in combination with others.

Examples of the amines include, but are not limited to, monoethanolamine, diethanolamine, and triethylamine. Each of these can be used alone or in combination with others.

Examples of the sulfur-containing compounds include, but are not limited to, dimethylsulfoxide, sulfolane, and thiodiethanol. Each of these can be used alone or in combination with others.

Among these, glycol ether compounds are preferred because they can exert a strong effect on the ink film to improve cleaning property.

The proportion of the water-soluble organic solvent in the cleaning fluid is preferably 60% by mass or more, and more preferably 70% by mass or more and 80% by mass or less.

Water

The type of water is not particularly limited and can be suitably selected to suit to a particular application. Examples thereof include, but are not limited to, pure water such as ion-exchange water, ultrafiltration water, reverse osmosis water, and distilled water, and ultrapure water. Each of these can be used alone or in combination with others.

The proportion of the water in the cleaning fluid is not particularly limited and can be suitably selected to suit to a particular application, but is preferably from 10% to 30% by mass, more preferably from 10% to 20% by mass.

Other Components

The cleaning fluid may further contain other components such as a surfactant, a defoamer, a preservative, a fungicide, a corrosion inhibitor, and/or a pH adjuster.

Surfactant

Examples of the surfactant include, but are not limited to, polyoxyalkylene surfactants, silicone-based surfactants, fluorine-based surfactants, amphoteric surfactants, nonionic surfactants, and anionic surfactants. Among these, polyoxyalkylene surfactants and silicone surfactants are preferred, and polyoxyalkylene surfactants are particularly preferred for cleaning property and storage stability.

Examples of the polyoxyalkylene surfactants include, but are not limited to, polyoxyethylene distyrenated phenyl ether and polyoxyethylene polyoxypropylene alkyl ether.

The polyoxyalkylene surfactants may be either synthesized products or commercially available products. Examples of the commercially available products include, but are not limited to, EMULGEN A-60 (polyoxyethylene distyrenated phenyl ether), EMULGEN LS-106 (polyoxyethylene polyoxypropylene alkyl ether), and EMULGEN LS-110 (polyoxyethylene polyoxypropylene alkyl ether), which are higher-alcohol-based ether-type nonionic surfactants manufactured by Kao Corporation. Each of these can be used alone or in combination with others.

The silicone-based surfactants are not particularly limited and can be suitably selected to suit to a particular application. Specific examples thereof include, but are not limited to, side-chain-modified polydimethylsiloxane, both-end-modified polydimethylsiloxane, one-end-modified polydimethylsiloxane, and side-chain-and-both-end-modified polydimethylsiloxane. More specifically, polyether-modified silicone-based surfactants having polyoxyethylene group and/or polyoxyethylene polyoxypropylene group as the modifying groups are preferable since they exhibit good properties as an aqueous surfactant.

Specific examples of the silicone-based surfactants further include polyether-modified silicone-based surfactants, such as a dimethyl siloxane compound having a polyalkylene oxide structure on a side chain which is bound to Si.

These surfactants may be either synthesized products or commercially available products. Commercial products are readily available from, for example, BYK-Chemie GmbH, Shin-Etsu Chemical Co., Ltd., Dow Corning Toray Silicone Co., Ltd., Nihon Emulsion Co., Ltd., and Kyoeisha Chemical Co., Ltd.

The polyether-modified silicone-based surfactants are not particularly limited and can be suitably selected to suit to a particular application. Examples thereof include, but are not limited to, a compound represented by the following general formula (S-1) that is a dimethylpolysiloxane having a polyalkylene oxide structure on a side chain which is bound to Si.

[Chem. 1]

General Formula (S-1)

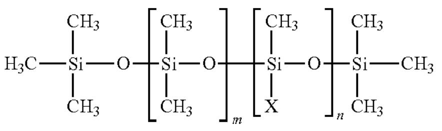

$X = -R(C_2H_4O)_a(C_3H_6O)_b R'$

In the general formula (S-1), each of m, n, a, and b independently represents an integer, R represents an alkylene group, and R' represents an alkyl group.

Specific examples of commercially available products of the polyether-modified silicone-based surfactants include, but are not limited to: KF-618, KF-642, and KF-643 (manufactured by Shin-Etsu Chemical Co., Ltd.); EMALEX-SS-5602 and SS-1906EX (manufactured by Nihon Emulsion Co., Ltd.); FZ-2105, FZ-2118, FZ-2154, FZ-2161, FZ-2162, FZ-2163, and FZ-2164 (manufactured by Dow Corning Toray Silicone Co., Ltd.); BYK-33 and BYK-387 (manufactured by BYK-Chemie GmbH); and TSF4440, TSF4452, and TSF4453 (manufactured by Toshiba Silicone Co., Ltd.).

Preferred examples of the fluorine-based surfactants include, but are not limited to, perfluoroalkyl sulfonic acid compounds, perfluoroalkyl carboxylic acid compounds, perfluoroalkyl phosphate compounds, perfluoroalkyl ethylene oxide adducts, and polyoxyalkylene ether polymer compounds having a perfluoroalkyl ether group on a side chain, each of which has weak foaming property. Specific examples of the perfluoroalkyl sulfonic acid compounds include, but are not limited to, perfluoroalkyl sulfonic acid and perfluoroalkyl sulfonate. Specific examples of the perfluoroalkyl carboxylic acid compounds include, but are not limited to, perfluoroalkyl carboxylic acid and perfluoroalkyl carboxylate. Specific examples of the polyoxyalkylene ether polymer compounds having a perfluoroalkyl ether group on a side chain include, but are not limited to, a sulfate of a polyoxyalkylene ether polymer having a perfluoroalkyl ether group on its side chain, and a salt of a polyoxyalkylene ether polymer having a perfluoroalkyl ether group on its side chain. Specific examples of the counter ions for these fluorine-based surfactants include, but are not limited to, Li, Na, K, $NH_4$, $NH_3CH_2CH_2OH$, $NH_2(CH_2CH_2OH)_2$, and $NH(CH_2CH_2OH)_3$.

Examples of the amphoteric surfactants include, but are not limited to, laurylaminopropionate, lauryl dimethyl betaine, stearyl dimethyl betaine, and lauryl hydroxyethyl betaine.

Examples of the nonionic surfactants include, but are not limited to, polyoxyethylene alkyl phenyl ethers, polyoxyethylene alkyl esters, polyoxyethylene alkyl amines, polyoxyethylene alkyl amides, polyoxyethylene propylene block polymers, sorbitan fatty acid esters, polyoxyethylene sorbitan fatty acid esters, and ethylene oxide adducts of acetylene alcohol. Examples of the anionic surfactants include, but are not limited to, acetate, dodecylbenzene sulfonate, and laurate of polyoxyethylene alkyl ether, and polyoxyethylene alkyl ether sulfate. Each of these can be used alone or in combination with others.

The proportion of the surfactant in the cleaning fluid is not particularly limited, but is preferably 0.001% by mass or more and 5% by mass or less, more preferably 0.05% by mass or more and 5% by mass or less, and particularly preferably 0.1% by mass or more and 3% by mass or less, for wettability to the wiper and wettability to the fixedly-adhered ink.

Defoamer

Specific examples of the defoamer include, but are not limited to, silicone-based defoamers, polyether-based defoamers, and fatty-acid-ester-based defoamers. Each of these can be used alone or in combination with others. Among these defoamers, silicone-based defoamers are preferred because they have excellent defoaming ability.

Preservative and Fungicide

Specific examples of the preservative and fungicide include, but are not limited to, 1,2-benzisothiazoline-3-one.

Corrosion Inhibitor

Specific examples of the corrosion inhibitor include, but are not limited to, acid sulphite and sodium thiosulfate.

pH Adjuster

The pH adjuster is not particularly limited as long as it is capable of adjusting the pH to 7 or higher. Specific examples thereof include, but are not limited to, amines such as diethanolamine and triethanolamine.

EXAMPLES

Further understanding of the present disclosure can be obtained by reference to certain specific Examples and Comparative Examples provided herein below for the purpose of illustration only and are not intended to be limiting.

Preparation of Wipers

Wipers 1 to 15 were prepared according to the descriptions presented in Table 1.

TABLE 1

| Wiper | Used Fiber | | Thickness (mm) | | Void Ratio | |
|---|---|---|---|---|---|---|
| No. | First Layer | Second Layer | First Layer | Second Layer | First Layer | Second Layer |
| 1 | Polyester | Rayon | 0.06 | 0.25 | 0.58 | 0.80 |
| 2 | Polyester | Rayon | 0.06 | 0.25 | 0.60 | 0.80 |
| 3 | Polyester | Rayon | 0.06 | 0.25 | 0.75 | 0.99 |
| 4 | Polyester | Rayon | 0.06 | 0.25 | 0.80 | 0.99 |
| 5 | Polyester | Rayon | 0.06 | 0.25 | 0.85 | 0.99 |
| 6 | Polyester | Rayon | 0.06 | 0.25 | 0.88 | 0.99 |
| 7 | Polyester | Rayon | 0.06 | 0.25 | 0.60 | 0.78 |
| 8 | Polyester | Rayon | 0.06 | 0.25 | 0.75 | 0.78 |
| 9 | Polyester | Rayon | 0.06 | 0.25 | 0.77 | 0.88 |

TABLE 1-continued

| Wiper No. | Used Fiber First Layer | Used Fiber Second Layer | Thickness (mm) First Layer | Thickness (mm) Second Layer | Void Ratio First Layer | Void Ratio Second Layer |
|---|---|---|---|---|---|---|
| 10 | Polyester | Rayon | 0.12 | 0.50 | 0.75 | 0.80 |
| 11 | Polyester | Polyolefin* | 0.06 | 0.25 | 0.77 | 0.88 |
| 12 | Polyester | Rayon (2 layers) | 0.06 | 0.1/0.12 | 0.77 | 0.82/0.95 |
| 13 | Polyester | Rayon | 0.06 | 0.25 | 0.85 | 0.81 |
| 14 | Polyester | Rayon | 0.30 | 0.10 | 0.78 | 0.92 |
| 15 | Rayon | Rayon | 0.25 | 0.25 | 0.99 | 0.99 |

*A porous body, and all others are non-woven fabrics.

Preparation of Cleaning Fluids

Cleaning fluids 1 to 8 were prepared by mixing components according to the descriptions presented in Table 2.

TABLE 2

| Cleaning Fluid No. | | 1 | 2 | 3 | 4 | 5 | 6 | 7 | 8 |
|---|---|---|---|---|---|---|---|---|---|
| Water-soluble Organic Solvent | Diethylene glycol ethyl methyl ether | 80 | | 30 | | 80 | | | 20 |
| | Diethylene glycol diethyl ether | | 70 | | 70 | | 60 | | 20 |
| | Dipropylene glycol monomethyl ether | | | 30 | | | | 50 | |
| | Propylene glycol | | | | | | | 20 | 20 |
| | γ-Butyrolactone | 5 | 15 | 20 | 3 | | 30 | | |
| | ε-Caprolactone | | | | | | | 15 | 20 |
| Surfactant | BYK-349 | 1 | | 1 | | 1 | | 3 | 0.05 |
| | EMULGEN LS-106 | | 1 | | 1 | | | | 0.05 |
| Water | Ion-exchange water | 14 | 14 | 19 | 26 | 19 | 10 | 12 | 19.9 |
| Total (% by mass) | | 100 | 100 | 100 | 100 | 100 | 100 | 100 | 100 |

The product names and manufacturers of the materials described in Table 2 are listed below.
Water-soluble Organic Solvents
Diethylene glycol ethyl methyl ether (manufactured by Tokyo Chemical Industry Co., Ltd.)
Diethylene glycol diethyl ether (manufactured by Tokyo Chemical Industry Co., Ltd.)
Dipropylene glycol monomethyl ether (manufactured by Tokyo Chemical Industry Co., Ltd.)
Propylene glycol (manufactured by ADEKA Corporation)
γ-Butyrolactone (manufactured by Tokyo Chemical Industry Co., Ltd.)
ε-Caprolactone (manufactured by Daicel Corporation) Surfactants
BYK-349 (silicone-based surfactant, manufactured by BYK-Chemie GmbH)
EMULGEN LS-106 (higher-alcohol-based ether-type nonionic surfactant, polyoxyethylene polyoxypropylene alkyl ether, manufactured by Kao Corporation)

Examples 1 to 17 and Comparative Examples 1 to 5

First, 0.1 ml of a white ink of RICOH PRO AR was dropped on a nozzle plate of an inkjet head of MH5440 manufactured by Ricoh Co., Ltd., and the nozzle plate was left to stand for 15 hours. As a result, the nozzle plate with the fixedly-adhered ink was prepared.

According to each combination described in Table 3, the wiper presented in Table 1 was applied with the cleaning liquid presented in Table 2 at 20 μl/$cm^2$. The wiper was made to wipe off the surface of the nozzle plate immediately after the application of the cleaning fluid and after being left to stand for 1 day in an environment having a temperature of 25 degrees C. and a relative humidity of 50%. The cleaning fluid was not reapplied after the wiper had been left for 1 day. In the wiping operation, the pressing force was 3 N and the wiping speed was 50 mm/s.

Evaluation Methods

The nozzle plate was visually observed after the wiping operations, and the number of times of wiping operations performed until the fixedly-adhered ink had been removed was evaluated. In the following evaluation criteria, A, B, and C are acceptable for practical use, B is preferable, and A is more preferable.

Evaluation Criteria

A: The wiping operation was performed 5 times or less until the fixedly-adhered ink on the nozzle plate had been removed.

B: The wiping operation was performed 6 or 7 times until the fixedly-adhered ink on the nozzle plate had been removed.

C: The wiping operation was performed 8 or 9 times until the fixedly-adhered ink on the nozzle plate had been removed.

D: The fixedly-adhered ink had remained even after the wiping operation was performed 10 times.

TABLE 3

| | Wiper No. | Cleaning Fluid No. | Evaluation Results Initial Stage | Evaluation Results After Being Left |
|---|---|---|---|---|
| Example 1 | 1 | 1 | C | C |
| Example 2 | 2 | 2 | B | B |
| Example 3 | 3 | 3 | A | A |
| Example 4 | 4 | 1 | A | A |
| Example 5 | 5 | 2 | B | B |
| Example 6 | 6 | 3 | C | C |
| Example 7 | 7 | 1 | C | C |
| Example 8 | 8 | 2 | B | B |
| Example 9 | 9 | 3 | A | A |
| Example 10 | 10 | 1 | A | A |
| Example 11 | 11 | 2 | A | A |
| Example 12 | 12 | 3 | B | B |
| Example 13 | 9 | 1 | A | A |
| Example 14 | 9 | 2 | A | A |
| Example 15 | 9 | 6 | B | B |
| Example 16 | 9 | 7 | A | A |
| Example 17 | 9 | 8 | A | A |
| Comparative Example 1 | 13 | 2 | D | D |
| Comparative Example 2 | 14 | 2 | D | D |
| Comparative Example 3 | 15 | 2 | D | D |
| Comparative Example 4 | 9 | 4 | A | D |
| Comparative Example 5 | 9 | 5 | A | D |

It is clear from the comparison between Examples and Comparative Examples 1 and 3 that, when the void ratio of the first layer is equal to or larger than the void ratio of the second layer, the wiping property for removing the fixedly-adhered ink is poor.

It is clear from the comparison between Examples and Comparative Examples 2 and 3 that, when the thickness of the first layer is equal to or larger than the thickness of the second layer, the wiping property for removing the fixedly-adhered ink is poor.

It is clear from the comparison between Examples 9, 13, 14, 16, and 17 and Comparative Examples 4 and 5 that, when the lactone compound in an amount of 5% by mass or more is not contained, the wiping property is good at the initial stage, but the initial wiping property is not kept after the wiper has been left to stand for a while.

The above-described embodiments are illustrative and do not limit the present invention. Thus, numerous additional modifications and variations are possible in light of the above teachings. For example, elements and/or features of different illustrative embodiments may be combined with each other and/or substituted for each other within the scope of the present invention.

REFERENCE SIGNS LIST

1 Main guide
2 Carriage
4, 4*a*, 4*b* Recording head
4*n* Nozzle
5 Main scanning motor
6 Drive pulley
7 Driven pulley
8 Timing belt
10 Sheet
12 Conveyance belt
13 Conveyance roller
14 Tension roller
16 Sub-scanning motor
17 Timing belt
18 Timing pulley
20 Maintenance mechanism
20*a* Cap
20*b* Nozzle surface wiping mechanism
21 Dummy discharge receptacle
23 Encoder scale
24 Encoder sensor
25 Code wheel
26 Encoder sensor
41 Nozzle plate
100 Discharge detecting unit
320 Wiper
400 Pressing roller
410 Roller
420 Winding roller
430 Cleaning fluid dropping device
440 Cleaning fluid accommodating container
450 Cleaning fluid
500 Foreign matter
610 First layer
620 Second layer
Na, Nb Nozzle array

The invention claimed is:

1. A wiping method for wiping a nozzle surface of a liquid discharge head, the wiping method comprising:

relatively moving the liquid discharge head and a wiper impregnated with a cleaning fluid, the cleaning fluid containing a lactone compound in an amount of 5% by mass or more, wherein the wiper includes:

a first layer configured to contact the nozzle surface, having a thickness of t1; and one or more layers other than the first layer, having a total thickness of t2, wherein t1 is smaller than t2, wherein a void ratio of the first layer is smaller than a void ratio of at least one of said one or more layers other than the first layer, and wherein the void ratio of each one of the layers is riven by the following formula:

void ratio=1−apparent density/true density.

2. The wiping method according to claim 1, wherein the void ratio of the first layer is from 0.60 to 0.85.

3. The wiping method according to claim 1, wherein the void ratio of the first layer is from 0.75 to 0.80.

4. The wiping method according to claim 1, wherein the first layer comprises a nonwoven fabric.

5. The wiping method according to claim 1, wherein the void ratio of the at least one of said one or more layers is from 0.80 to 0.99.

6. The wiping method according to claim 1, wherein the wiper has a thickness of from 0.1 to 3 mm.

7. The wiping method according to claim 1, wherein the lactone compound is γ-butyrolactone.

8. The wiping method according to claim 1, wherein the cleaning fluid contains the lactone compound in an amount of 5% by mass or more and 30% by mass or less.

9. An image forming apparatus, comprising:

a liquid discharge head having a nozzle surface having a nozzle; and a wiper impregnated with a cleaning fluid, the cleaning fluid containing a lactone compound in an amount of 5% by mass or more, the wiper including:

a first layer configured to contact the nozzle surface, having a thickness of t1;

and one or more layers other than the first layer, having a total thickness of t2, wherein t1 is smaller than t2, wherein a void ratio of the first layer is smaller than a void ratio of at least one of said one or more layers other than the first layer, wherein the liquid discharge head and the wiper are configured to relatively move to wipe the nozzle surface with the wiper, and wherein the void ratio of each one of the layers is given by the following formula:

void ratio=1−apparent density/true density.

10. The image forming apparatus according to claim 9, wherein the void ratio of the first layer is from 0.60 to 0.85.

11. The image forming apparatus according to claim 9, wherein the void ratio of the first layer is from 0.75 to 0.80.

12. The image forming apparatus according to claim 9, wherein the first layer comprises a nonwoven fabric.

13. The image forming apparatus according to claim 9, wherein the void ratio of the at least one of said one or more layers is from 0.80 to 0.99.

14. The image forming apparatus according to claim 9, wherein the wiper has a thickness of from 0.1 to 3 mm.

15. The image forming apparatus according to claim 9, wherein the lactone compound is γ-butyrolactone.

16. The wiping method according to claim 1, wherein the cleaning fluid contains water in an amount of from 10% by mass to 30% by mass.

* * * * *